United States Patent [19]

Cunningham et al.

[11] Patent Number: 5,305,981
[45] Date of Patent: Apr. 26, 1994

[54] MULTIAXIS VIBRATION ISOLATION SYSTEM

[75] Inventors: David C. Cunningham, Carefree; Lawrence P. Davis; Frank M. Schmitt, both of Phoenix, all of Ariz.

[73] Assignee: Honeywell Inc., Minneapolis, Minn.

[21] Appl. No.: 785,726

[22] Filed: Oct. 31, 1991

[51] Int. Cl.⁵ .............................................. F16M 13/00
[52] U.S. Cl. .................................... 248/550; 248/603; 248/631
[58] Field of Search ............... 248/550, 573, 603, 618, 248/636, 638, 654

[56] References Cited

U.S. PATENT DOCUMENTS

| | | | |
|---|---|---|---|
| 3,066,905 | 12/1962 | Gertel | 248/573 X |
| 3,151,833 | 10/1964 | Thrasher | 248/631 X |
| 3,540,688 | 11/1970 | Schulte. | |
| 3,565,386 | 2/1971 | Lemkuil | 248/573 |
| 3,952,979 | 4/1976 | Hansen | 248/638 X |
| 4,270,393 | 6/1981 | Osborne et al. . | |
| 4,760,996 | 8/1988 | Davis. | |
| 4,848,525 | 7/1989 | Jacot et al. | 248/550 X |
| 4,988,244 | 1/1991 | Sheldon et al. | 248/631 X |
| 5,131,611 | 7/1992 | Vollaro | 248/550 X |

*Primary Examiner*—Karen J. Chotkowski
*Attorney, Agent, or Firm*—Arnold L. Albin; Dale E. Jepsen; Ronald E. Champion

[57] ABSTRACT

A system for isolating a supported structure from transmitting vibrations to a supporting base in a spacecraft provides six degrees of freedom in a kinematic mounting. Six isolator elements in a symmetric arrangement of three skewed isolator pairs provides viscous damping and vibration and shock attenuation during launch and operation in space. The isolators employ two degrees of freedom flexure joints at each mounting point to assure primarily axial deflection and minimize bending moments, and have tuning springs to optimize performance. The system permits deterministic design and allows calculation of all loads from the nominal geometry and the isolator axial stiffness. Limit stops are provided between the supporting structure and the supported structure to limit excursions of the isolator members.

12 Claims, 7 Drawing Sheets

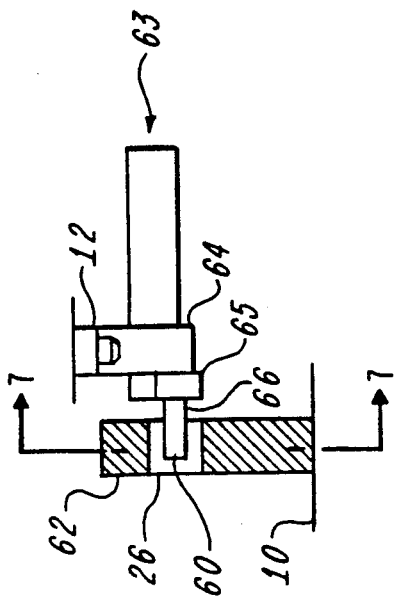
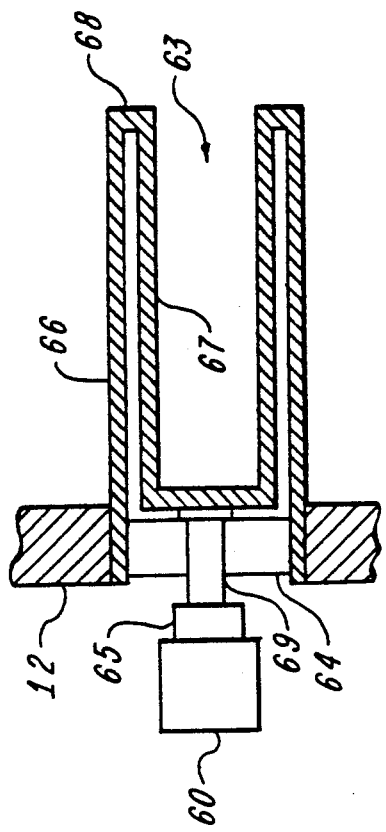
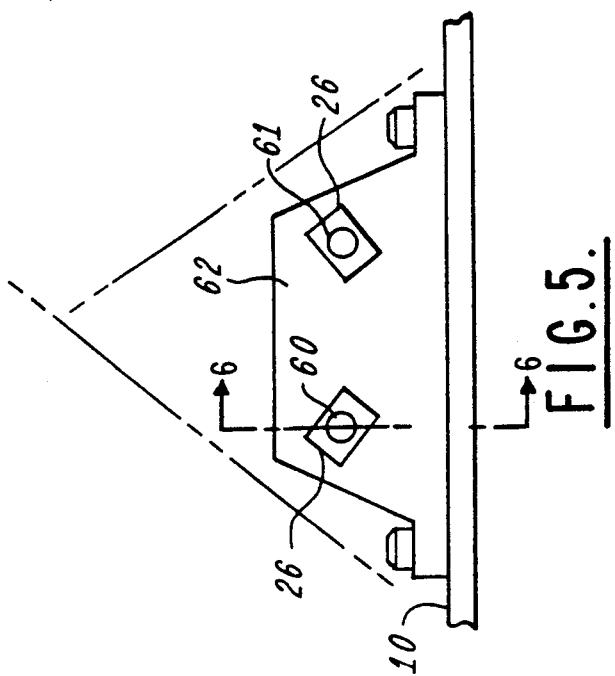
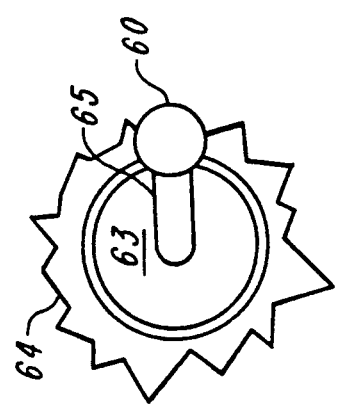

MULTIAXIS VIBRATION ISOLATION SYSTEM

BACKGROUND OF THE INVENTION

1. Field Of The Invention

The present invention relates to a viscous isolator, and more particularly to a vibration isolator and damper for isolating a reaction wheel assembly on a supporting structure while permitting a mounting base to be moved relative to the supporting structure along multiple axes of freedom.

2. Description Of The Prior Art

Spacecraft reaction wheel assemblies used for pointing control systems, as on a telescope, can emit vibrations into the spacecraft structure that result in blurred images in optical sensors carried by the spacecraft. A reaction wheel assembly produces vibration disturbances when it rotates due to imperfections in the electromagnetics and their drive electronics, unbalance of the rotor, and imperfections in the spin bearings. Since the reaction wheel assemblies provide a desired control torque for positioning the optical elements in the absence of a chemical reaction propulsion system, the isolation system provide attenuation above specific natural frequencies and must have peaking factors in one or more degrees of freedom without impairing transmission of the desired control torques. To maintain accuracy, vibrations must be isolated between the supported structure and the supporting system during both ground loading (one G) and in orbit (zero G).

One system for isolating vibrations is disclosed in U.S. Pat. No. 3,540,688, wherein a supporting system employs pivoted single-axis isolators arranged into a bipod and a tetrahedron in which the isolators are supported by means of universally rotatable joints to provide a kinematic mount system.

U.S. Pat. No. 4,848,525 discloses an active 6 degree-of-freedom pointing and isolation system having a magnetically suspended positioning system mounted above a hexapod of linear actuators.

Critical to the above isolation systems is the design of the isolator element. Typically, the prior art isolator elements have been designed for relatively high frequencies, of the order of 15 Hz or greater; therefore, deflections due to one G ground loading and launch vibrations were relatively small and not a limiting factor. However, in some applications the vibration isolator is required to provide specific natural frequencies and peaking factors in one or more degrees of freedom. Thus, for an application with a magnetically suspended wheel the radial translation motion was required to be isolated at a relatively low frequency (4.0 Hz), and very tightly controlled frequencies and peaking factors were specified for all six degrees of freedom to avoid interaction with the magnetic suspension control system. Moreover, the isolator was required to operate in both ground and orbit environments. Where the prior art applications utilized a ridgedly attached isolator the radial translational frequency at 4 Hz could not be accurately controlled.

Moreover, viscous damped isolators are designed to produce damping in their axial direction by fluid shear through a controlled annulus. Damping in the radial direction is typically very low as compared to axial damping and not accurately controlled. Therefore, the peaking factor of the radial translational isolator frequency could not be accurately controlled. Further, radial deflection was limited to the radial clearance of the annulus which must be relatively small to achieve good axial and radial damping. A low frequency radial translational isolator requires a larger value of radial motion than can be provided by the prior art isolators. Still further, the small radial gap coupled with the low radial stiffness precludes operation in the radial direction at one G, and results in the isolator chattering between its stops during launch vibration with the resultant transmittal of impact loads to the reaction wheel assembly.

The present invention avoids the foregoing limitations by providing a hexapod of isolation elements pivoted at each end to carry only axial loads. Travel limiting stops are build into the structure so as to avoid transmitting the loads caused by impact during launch to the isolator elements. A tunable viscous damper is provided which may be peaked at a desired resonant frequency.

SUMMARY OF THE INVENTION

The present invention overcomes the problems of the prior art by providing a vibration isolating and damping apparatus that passively isolates vibrations between a supporting structure and a supported structure while permitting movement of the supported structure over six degrees of freedom with respect to the supporting structure, wherein the supported structure contains a torque producing device for developing a control torque.

Three sets of isolators, skewed at a predetermined angle, are grouped into bipods or pairs which are attached to the supported structure in the plane of the payload mass center. Each of the isolator elements is pivoted at each end so that only axial loads are carried by the elements during rotation and translation of the payload. Travel limiting stops may be build into the apparatus so as to maximize the allowable deflection of the supported structure and avoid transmitting impact loads through the isolator angular pivots.

More particularly, the invention comprises a cradle for supporting the supported structure, a plurality of isolators each having a body, a first end secured in a flexible manner to the supporting structure and a second end flexibly secured to the cradle, the isolator supporting the cradle with respect to the supporting structure in a relatively movable fashion. The isolators are arranged in pairs on a common base on the cradle and skewed by a given angle with respect to the supporting structure, the pairs of isolators being substantially parallel to an azimuthal axis passing through the centers of the supporting structure and the cradle. The isolators are further arranged in substantially equiangularly disposed pairs about the azimuthal axis and provided with a flexible joint which provides at least two degrees of freedom at each of the ends of the isolators so that opposite ends of each isolator are relatively movable axially and each of the isolators being movable relative to each other along their respective longitudinal axes while maintaining the supported structure in a kinematic relation with the supporting structures. The isolators are designed to provide a complex mechanical impedance as a function of vibration frequency which allows transmission of the control torque producing frequencies of the torque producing device while suppressing transmission of undesired vibration frequencies of the reaction wheel assembly to other spacecraft structures.

More particularly, the isolator pairs are arranged substantially 120 degrees apart with each isolator member being inclined substantially at 38.3 degrees relative to the plane of the supporting structure. Mounting surfaces of the supporting structure are distributed so as to support the second ends of the isolators whereby the plane of the flexible joints thereof contains the center of mass of the supported structure. In a preferred environment, the apparatus includes means for limiting the maximum movement of the cradle relative to the supporting structure in which the allowable movement is less than the maximum movement of the cradle relative to the supporting structure provided for by the isolators. These constraints are provided by a pair of coaxial metallic tubes being joined at a first end proximal to the azimuthal axis and disposed in parallel to the plane of the cradle and radial to the azimuthal axis passing through the cradle. The outer tube is preferably fixed to the supporting structure at the first end of a pair of isolators and the cradle is provided with an aperture having a predetermined clearance for a stop arm extending radially and outwardly, the stop arm being affixed to the inner tube and disposed for constraining motion of the cradle so that the deflection of the cradle induced by vibration of the reaction wheel assembly will cause the stop arm resiliently to apply a predetermined counterforce to the cradle, thereby restraining the isolator from deflection greater than a predetermined value.

In a further preferred environment, the viscous vibration and damping isolator comprises a base member having an inner and outer face and provision for attaching the outer face to the supporting structure. A first bellows is joined to the inner face of the base member and forms a fluid seal, the other end of the first bellows being joined to a first face of an axially aligned piston, so that the base member, the first bellows, and the piston provide a first fluid chamber which is filled with damping fluid. The first bellows is expansible and contractible in an axial direction. A hollow main cylindrical housing has a closed first end and an open second end and is aligned axially with the piston and joined at its circumference to a second face of the piston. A second bellows is received within the main cylindrical housing and axially aligned with the first bellows. It is joined at a first end to a second opposing face of the piston and at a second end to a second hollow cylindrical housing which is coaxially disposed within the main cylindrical housing. The second bellows is also expansible and contractible in an axial direction and has an outer diameter which exceeds the inner diameter of the main cylindrical housing and has an inner diameter which is greater than the outer diameter of the second cylindrical housing. Thus, the second hollow cylindrical housing, the second bellows, and the piston comprise a second fluid chamber which is also filled with damping fluid and communicates with the first fluid chamber through an axial bore in the piston. The second hollow cylindrical housing is further provided with closed ends and an exterior centrally located flange which forms a fluid seal with the second bellows. The piston is provided with an axial bore in which an axial shaft is slideably disposed. At its distal end, the axial shaft is joined to the inner face of the base member and at its proximal end the axial shaft is joined to the first end of the second cylindrical housing. The axial bore forms a radial gap with the axial shaft and the radial gap provides fluid coupling between the first and second chambers. Stiffness of the damper is augmented by a tuning spring that is placed between the base and the piston and arranged in plurality about the first bellows. The isolator is further provided with a stem, connected to the main cylindrical housing at its closed end, which is adapted to move the piston axially when force is applied to the stem and to damp reciprocation of the stem by utilizing viscous resistance of the fluid when the stem moves in the axial direction of the main cylindrical housing as induced by vibration of the supported structure.

Preferably, temperature compensation is provided by a thermal compensator bellows disposed within the second cylindrical housing, which forms a fluid seal with an end cap defined by a closed end of the second cylindrical housing. A compensator spring is disposed within the bellows for establishing positive pressure, the bellows and second cylindrical housing defining a third fluid chamber which is filled with fluid and fluidly coupled through a fluid passage in the axial shaft to the radial gap into the first and second fluid chambers, thereby allowing an exchange of fluid between the temperature compensator and the first and second fluid chambers to effect a constant fluid pressure to be maintained in the system with temperature variations.

BRIEF DESCRIPTION OF THE DRAWINGS

FIG. 5 is a conceptual side elevation view of one embodiment of the motion limiter elements used to predetermine the allowed deflection of the cradle.

FIG. 6 is a side elevation view of the motion limiter stops of FIG. 5.

FIG. 7 is an enlarged end view of the stop assembly of FIG. 6.

FIG. 8 is a cross-sectional view corresponding with the stop limiter of FIG. 6.

DESCRIPTION OF THE PREFERRED EMBODIMENT

Figure 1:
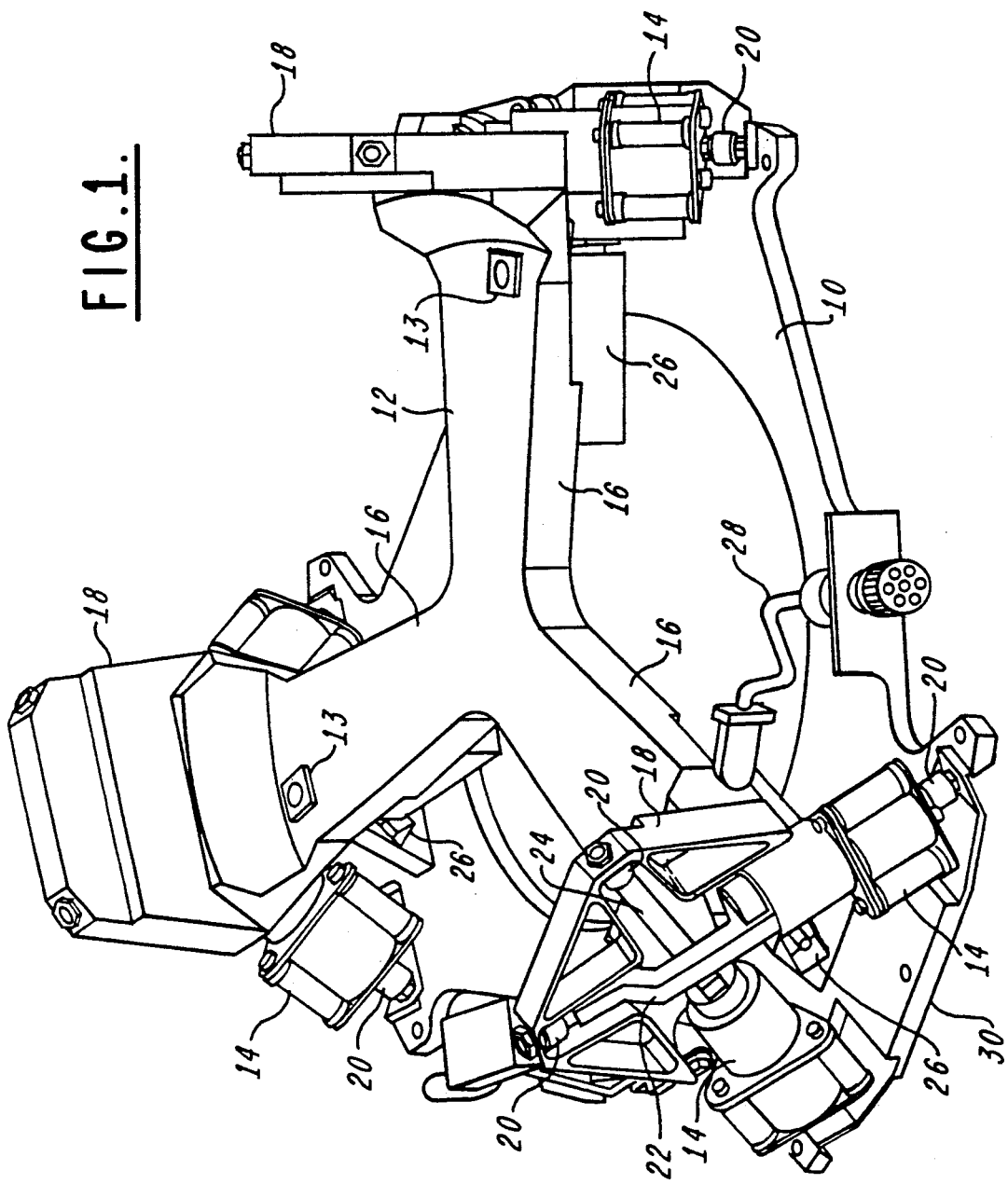
FIG. 1 is a perspective view of the multiaxis isolation system of the present invention as used in an earth-orbiting spacecraft.
Figure 2:
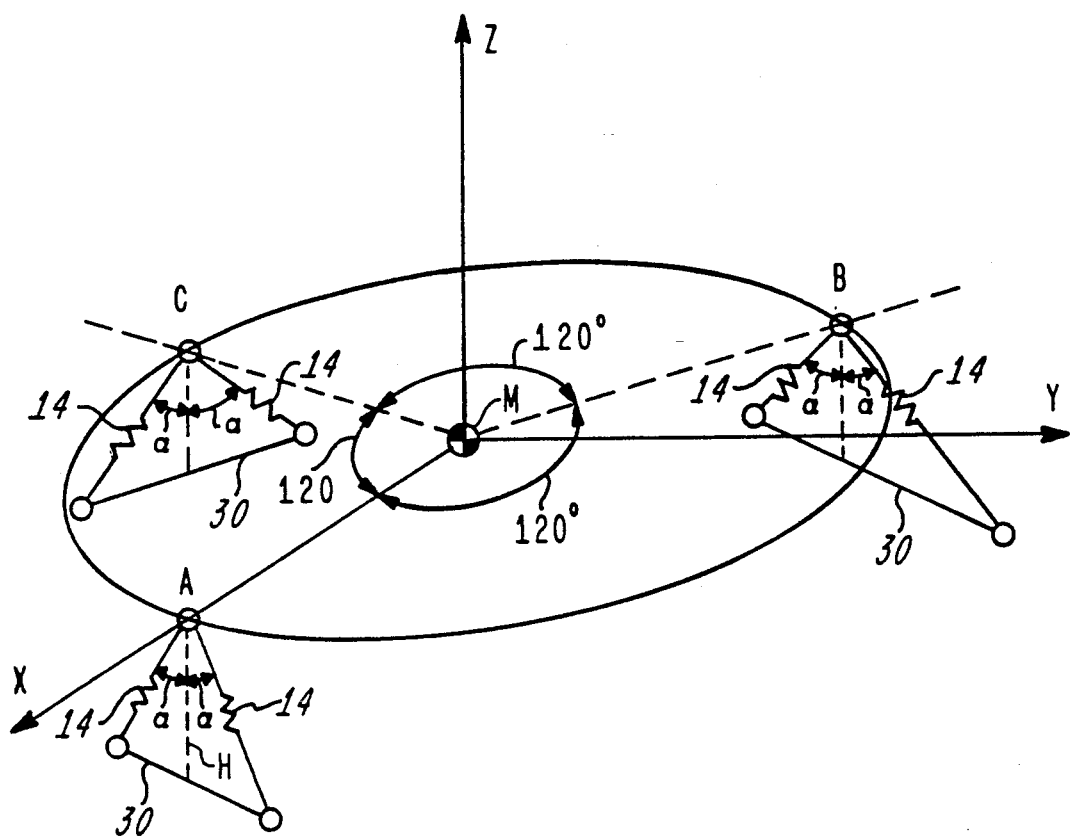
FIG. 2 is a schematic drawing showing the hexapod geometry of the present invention.

With reference to the drawings and particularly to FIGS. 1 and 2, a preferred embodiment of an isolating system constructed in accordance with the present invention comprises a base or supporting structure 10 and a frame or cradle 12 which is suspended from the supporting structure by a plurality of viscous isolators 14. Cradle 12 is provided with a plurality of angularly spaced apart members 16 in the shape of a "Y", with each arm 16 being spaced from another arm 16 substantially by 120 degrees. A plurality of mounting surfaces 13 are distributed laterally and equilaterally upon the cradle 12 for mounting the reaction wheel assembly. A member 18 extends distally and at right angles to each arm of the cradle for supporting the stem ends of the isolators. Each isolator is provided with a flexible joint 20 which permits free translation of an associated isolator through at least two dimensions. Such joints may be formed from either spherical bearings or two-axis flexures. In this manner, the plane of the flexible joints supporting the stems is arranged to contain the center of mass of the reaction wheel assembly. One isolator stem 22 is provided with a lateral offset so as to clear the stem 24 of the associated isolator. The cradle 12 also carries an associated cable and connector 28 for providing electrical connections to the supported structure.

Provision is made by a stop assembly 26 for limiting the maximum movement of the cradle 12 relative to the supporting structure 10 so that the allowable relative displacement of the cradle is less than that provided for by the design of the isolators. In one embodiment, shown in FIGS. 5-8 the stops to limit isolator motion are shown located at each isolator pair between the supporting structure 10 and cradle 12. This arrangement places the stops in parallel with the isolator elements and as a result the stop contact forces will not be applied through the isolator element and the pivot flexures. The stop location can be chosen to accommodate the expected translational motion due to acceleration in the azimuthal direction with allowance for tolerances. Particulars of the stop design are described below.

Referring now to FIG. 2, the invention is comprised of a system of six identical single degree of freedom isolation elements 14 arranged in a symmetrical pattern of three isolator pairs, in which each pair of elements is connected with a point A, B, or C, 120 degrees apart. The elements are grouped in three sets of pairs or bipods, which are attached to the cradle at a radius R in the plane of the reaction wheels' mass center. The elements in each isolator pair are skewed by angle from the Z or azimuth axis extending longitudinally and at right angles to the XY plane, with the angle measured about the line connecting the attachment point A, B, or C to the center of mass M. In the preferred embodiment, the base 30 of each pair of isolator elements is formed by the supporting structure 10. In the preferred embodiment, each isolator member of each isolator pair is inclined substantially at 38.3 degrees relative to the Z axis.

Figure 3:
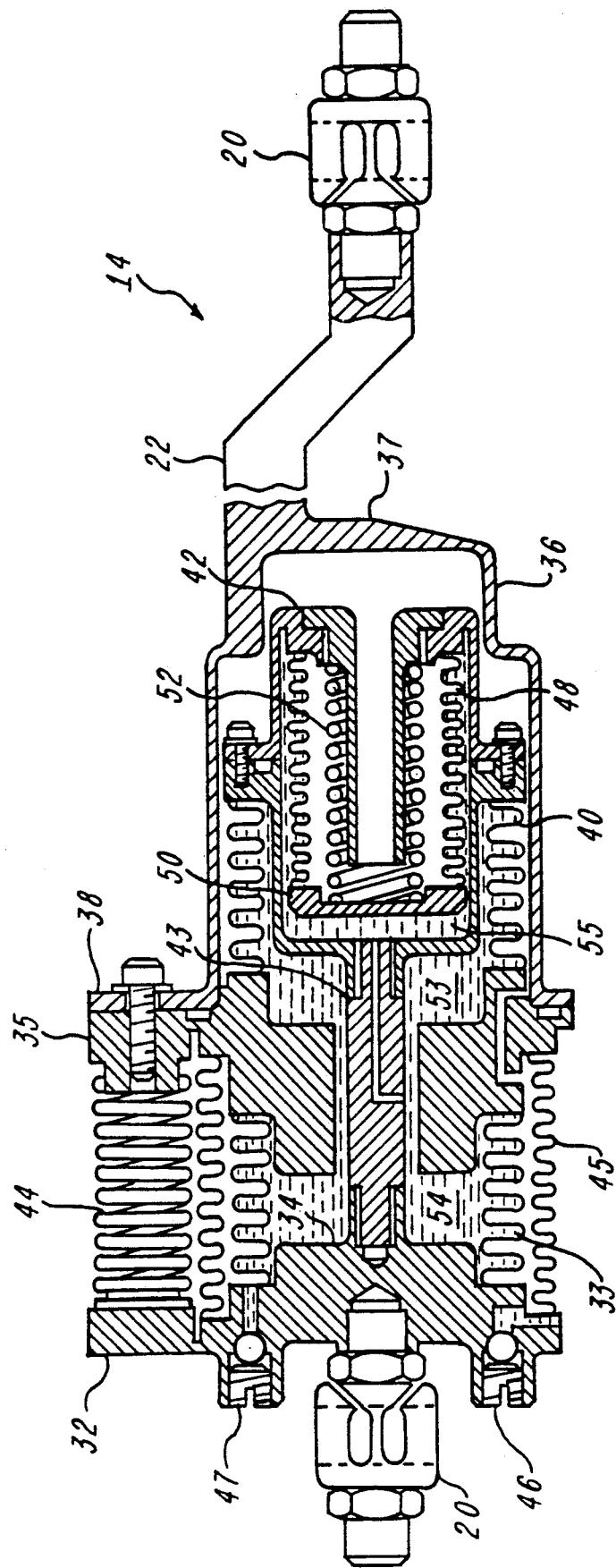
FIG. 3 is a cross-sectional view of a vibration isolator element constructed in accordance with this invention.

The viscous isolator of the present invention will now be described with respect to FIG. 3. The isolator 14 includes a base member 32 having outer and inner faces and in which the outer face is coupled to a supporting structure (not shown) by a lower pivot member 20. A lower bellows 33 is joined at the first end to the inner face 34 of base 32 and bonded to provide a fluid seal and structural integrity. At its upper end lower bellows 33 is bonded to a piston 35, also to provide a fluid seal and structural integrity. The bellows 33 is expansible and contractible in an axial direction, and in combination with the base member 32 and piston 35 defines a first fluid chamber which is to be filled with a suitable damping fluid, such as silicone. An upper cylindrical housing 36 has a closed end 37 which is structurally affixed to the offset stem 22. Cylindrical housing 36 is axially aligned with piston 35 and joined structurally to piston 35 at the open end 38 of housing 36. A second bellows 40 is axially aligned with bellows 33 and disposed within upper cylindrical housing 36. Bellows 40 is joined at a first end in common with piston 35 and with the open end of cylindrical housing 36. A second end of bellows 40 distal to piston 35 is joined to a second cylindrical housing 42 which is coaxially disposed within the upper cylindrical housing 36. Bellows 40 is also expansible and contractible in an axial direction of the upper cylindrical housing 36 and is provided with an outer diameter somewhat less than the inner diameter of cylindrical housing 36 and has an inner diameter greater than the cylindrical housing 42 so as to define a second fluid chamber between the exterior of the second cylindrical housing 42 and bellows 40 and joined with piston 35 so as to define a second fluid chamber also filled with damping fluid.

Piston 35 is provided with an axial bore. The cylindrical housing 42 is closed at lower end with the upper end having an end cap provided with an annular bore and having an exterior located flange to form a fluid seal with the second bellows. An axial shaft 43 is positioned within the bore of piston 35 to form a radial gap therebetween, the radial gap providing fluid coupling between the first and second fluid chambers. Shaft 43 is joined at its lower end to the inner face 34 of base member 32 and its upper end to cylindrical housing 42 and it is provided with an annular bore for fluid coupling to a third fluid chamber, whose function is to be described below.

Since the bellows are designed with low stiffness, a plurality of tuning springs 44 are disposed between the inner face of base 32 and piston 3 and approximately equiangularly disposed about the circumference of the first bellows 33. Coil springs are placed in parallel with the main bellows and adjusted to obtain the required stiffness, approximately one-third of which being allocated to the multiple bellows and two-thirds to the springs.

One isolator in each pair further includes a stem 22 which may be offset as shown and which is affixed to housing 36 so as to move piston 35 axially when the force is applied to upper pivot 20, while the offset allows the stem of and adjacent isolator to move freely while minimizing the space requirements of the supports.

A third bellows 45 is used to provide a redundant seal over first bellows 33 and provides a fluid seal between the base 32 and piston 35. Piston 35 and base 32 are provided with a fluid passage to allow pressure communication between bellows 45 and the enclosure defined by the cylindrical housing 36 and cylindrical housing 42. Its purpose is to allow atmospheric pressure equalization and to allow evacuation, thus simulating space conditions. A vent port 46 is used for this purpose. Fluid port 47 is used to fill the fluid chambers with a damping fluid.

Fluid volume variation with temperature change is compensated for by a spring-loaded piston acting to pressurize the damping fluid. A small fluid passage in the axial shaft joins the compensator volume to the main fluid volume at the midpoint of the annular passage where the fluid pressure is maintained substantially constant with temperature. This temperature compensation is provided by a thermal compensator bellows 48 disposed within cylindrical housing 42 and sealed by lower end cap 50 and enclosed by the upper end cap of cylindrical housing 42. Temperature compensator spring 52 is arranged to apply a predetermined pressure on lower end cap 50 so as to pressurize the damping fluid effectively to one half the peak pressure obtained in operation. Fluid expansion due to temperature increase causes temperature compensator bellows 48 to contract thereby allowing additional space for the expanded fluid while maintaining the predetermined pressure by temperature compensator spring 52, thereby relieving an over-pressure condition in the first and second fluid chambers and damping gap of the isolator to maintain a substantially constant system pressure. The axial force maintained on thermal compensator bellows 48 by preload spring 52 establishes a positive pressure on the damping fluid over a wide range of temperature conditions.

Figure 4:
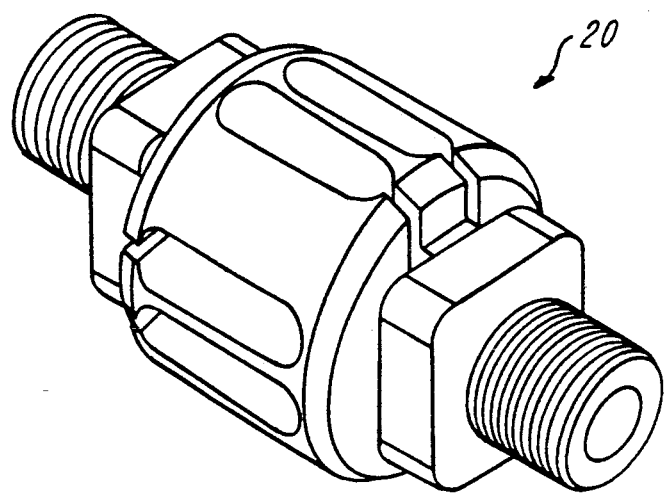
FIG. 4 is a prospective view of the multiaxis pivot as shown in FIG. 3.

Affixed to the base 32 of isolator 14 is a lower pivot 20 and affixed to the stem 22 is an upper pivot 20 of identical construction. By providing these freely moving joints at both ends of the isolator element, an impact or vibratory load in any direction applied to cradle 12 is translated into only axial load in its movement of the isolator elements. The springs and dampers therefore can be optimized for performance along one degree of freedom. FIG. 4 is a perspective view of a preferred embodiment of the flexure pivot. The pivots at each end of the isolator have two angular degrees of freedom. Since they consist of two right angle bending elements, machined into a solid cylinder, they introduce no friction into the system. Having relatively low stiffness, the flexures preclude significant bending loads on the isolator.

The operation of isolator 14, constructed in this manner, will now to be described. When lower pivot 20 moves in an axial direction such that base 32 is pushed toward fluid chamber 54, some of the damping fluid in fluid chamber 54 flows into fluid chamber 53 via the radial gap formed in the annular bore of piston 35. As the damping fluid flows through piston 35 in this manner, a damping force is produced by the viscous resistance of the fluid with axial shaft 43. As a result, piston 35 is subjected to this resistance and compresses bellows 40. At the same time, the fluid in fluid chamber 53 is compressed in accordance with the depth of compression of lower pivot 20. Accordingly, bellows 33 and bellows 45 contract, thereby reducing the capacity of fluid chamber 54, so that the force exerted by the fluid therein increases. If lower pivot 20 moves in a direction such that it extends out from main cylinder housing 36, on the other hand, some of the fluid in fluid chamber 53 flows into fluid chamber 54 between the base 32 and piston 35. Also, in this case, bellows 40 extends and the fluid flows past the restrictive radial gap in piston 35 so that motion of stem 22 is damped.

In response to the movement of lower pivot 20 in the extending direction fluid chamber 54 increases in capacity, so that bellows 33 and 45 extend. Thus, as lower pivot 20 repeatedly extends and contracts relative to stem 22, or stem 22 extends and contracts relative to lower pivot 20, the isolator serves as both shock absorber, vibration absorber, and damper.

Figure 9:
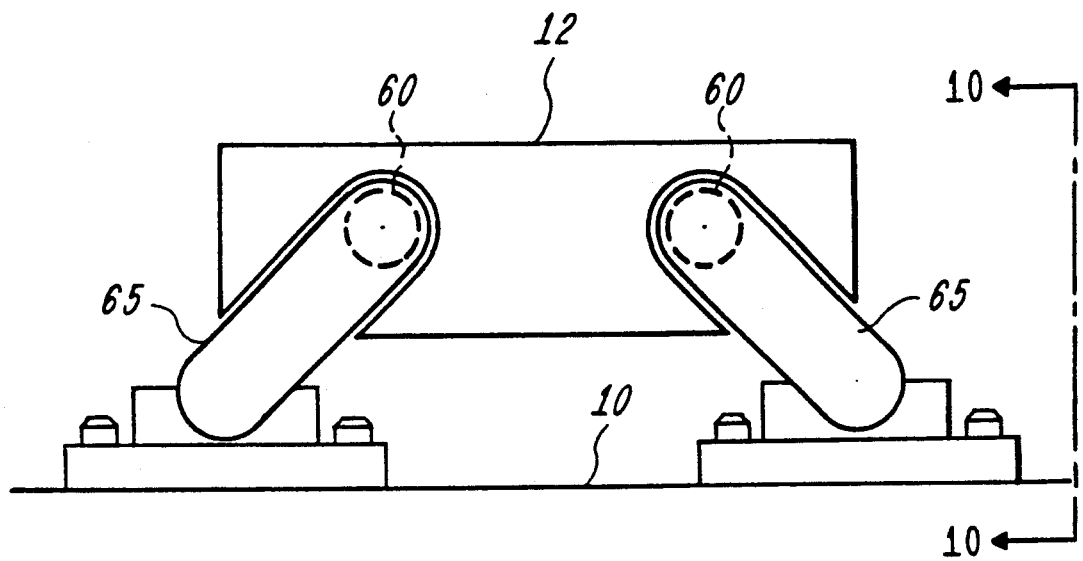
FIG. 9 is a plan view of a further embodiment of the stop structure of the present invention.
Figure 10:
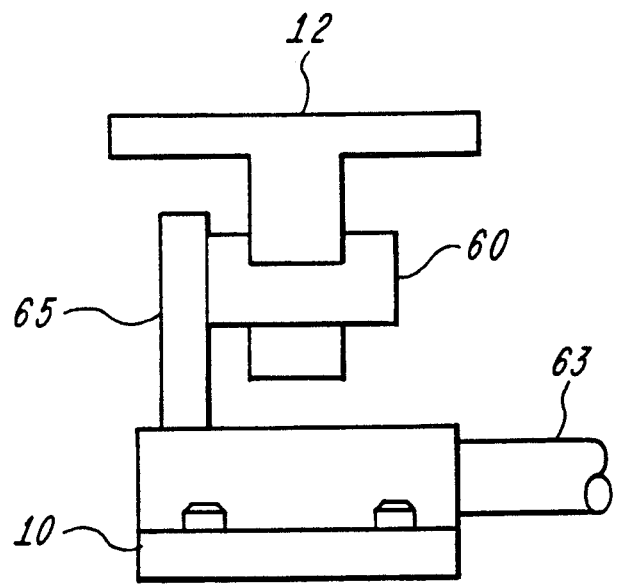
FIG. 10 is an end view of the structure of FIG. 9.

Referring now to FIGS. 5–8, there are shown the structures limiting the device which protects the isolator elements from excessive excursions imposed during launch and in zero gravity space. FIG. 5 is a conceptual plan view showing schematically the supporting structure 10, cradle 12, motion limiting aperture 26, and motion stops 60 and 61. In the structure illustrated, the stops 60 and 61 are supported from the cradle; however, in an alternate embodiment stops 60 and 61 may be joined to supporting structure 10 and operatively limiting apertures provided in the cradle 12. This alternate structure is shown in FIG. 9 and FIG. 10. With continued reference to FIG. 5, member 62 is affixed to base structure 10 and provided with motion limiter apertures 26 which are configured to allow free motion of stops 60 and 61, respectively, within predetermined limits. Referring now to FIG. 6, the stop assembly is shown in side view. Member 62 has defined within an aperture therein motion limiter 26. Stop member 60 is comprised of a coaxial tube assembly 63 which in this view is supported from the cradle 12, including a bearing assembly 64, within which a portion of tube assembly 63 is allowed to rotate, and a crank 65 to which is affixed stop member 66. An end view taken through 7—7 of FIG. 6 is shown in FIG. 7. Tube assembly 63 supports crank arm 65 which is affixed to stop number 66. Tube assembly 63 is seen to be supported by bushing 64.

Referring now to FIG. 8, a detailed view of the tube assembly is shown. Tube assembly 63 is comprised of first and second coaxial tubes 66, 67 disposed in parallel to the plane of the cradle 12 and are joined at end 68 by welding, braising, or other similar means. Outer tube 66 is secured to the base structure 10 at one end. The free end of inner tube 67 is provided with a shaft 69 which extends through support bearing 64 to crank arm 65. Crank arm 65 is in turn provided with stop member 60 at right angles to shaft 69. In response to deflection of cradle 12 induced by motion of the supported structure, stop member 60 will be caused to engage aperture 26 after a predetermined deflection of the cradle. This will cause free arm 65 to apply a torque to inner tube 67 and resiliently apply a predetermined counterforce to cradle 12 thereby restraining the isolator elements from deflection greater than a predetermined value which is established from the spring constant of the tube assembly 63, and using the dimensions of stop number 60 and motion limiter aperture 26.

FIGS. 9 and 10 show an alternate embodiment of the motion limiting structure. Cradle 12 is provided with slots to receive a stop 60 which again engages crank arm 65 to produce a limiting force from the coaxial tube assembly 63, here secured to base 10.

It may be seen from the foregoing that the deterministic design of the isolators allows calculation to establish the required amount of damping and the required stiffness of the elastic members when given the force, direction of force, frequency range, amplitudes and directions of vibrations to be expected. The kinematic structure is adaptable to deformation of the supporting structure as well as mounting errors of the flexure joints connecting the isolator elements to the structures without applying undesired constraints. Element design requirements can be derived from the system frequency and peaking (Q) requirements. The element stiffness (K), damping constant (C), and skew angle ($\alpha$) can, for example, be selected to match the X/Y translational frequency (fx), the X/Y rotational frequency (fx) and the X/Y translational peaking frequency (Qx). The steady state frequency response can be computed from the known constants and transfer functions as shown in FIGS. 11–14. It is also possible to select the skew angle ($\alpha$) for isoelastic stiffness where $Kx = Ky = Kz$. By arranging the isolator elements inclined relative to the azimuth axis, the system may be provided with significantly increased stiffness with respect to the movement of the cradle along the Z axis. More specifically, the axial restraint attributable to the stiffness of the suspension elements about their axes varies with the cosine squared of the angle. Consequently, the axial stiffness of the system will decrease as the angle (α) is increased.

Figure 11:
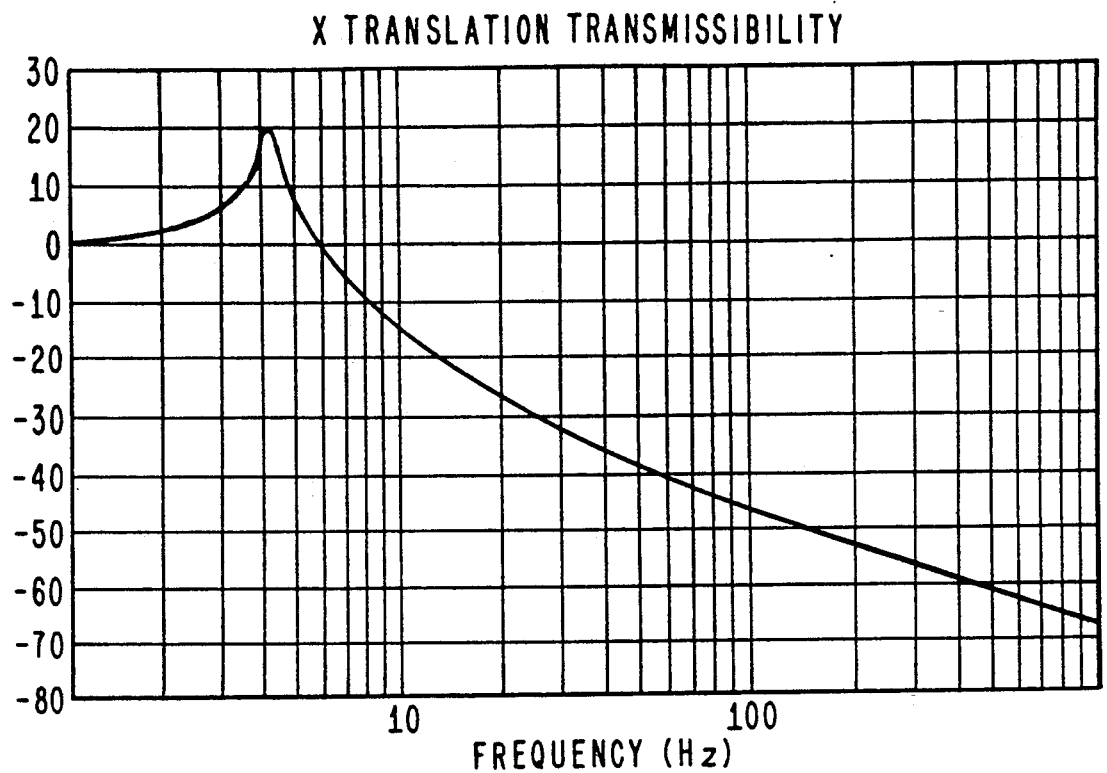
FIG. 11 is a graph showing transmission loss as a function of frequency for translation along the X-axis.
Figure 12:
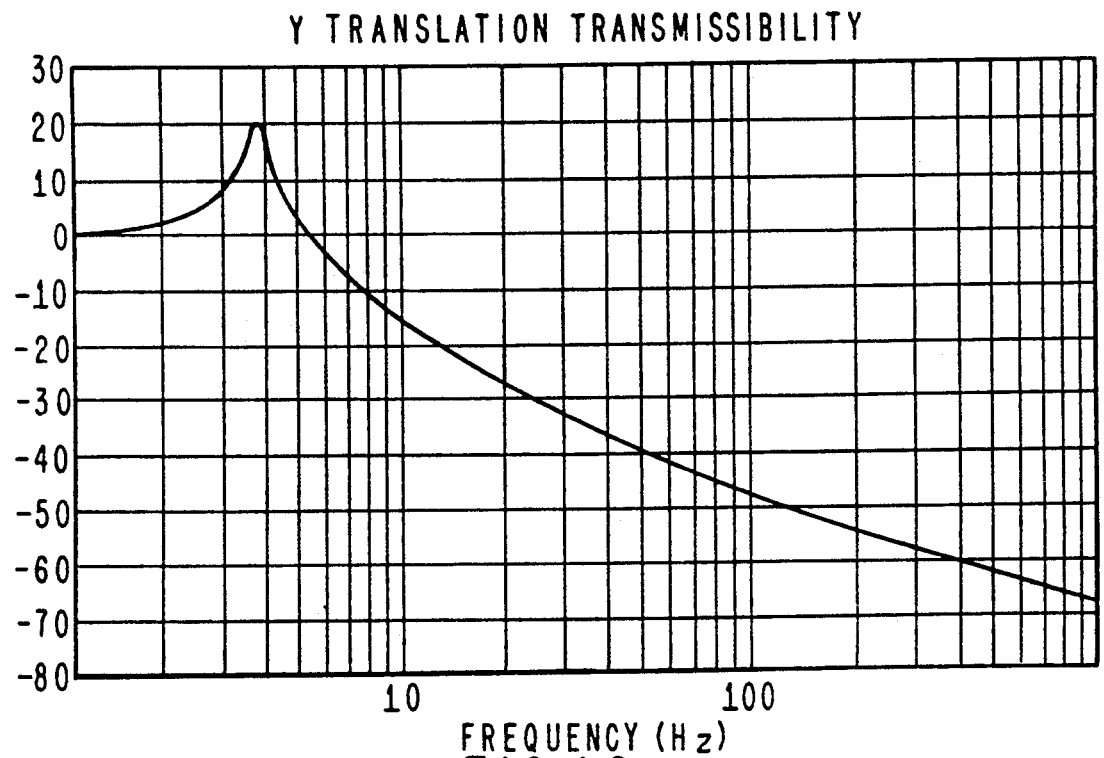
FIG. 12 is a graph showing transmission loss as a function of frequency for translation along the Y-axis.
Figure 13:
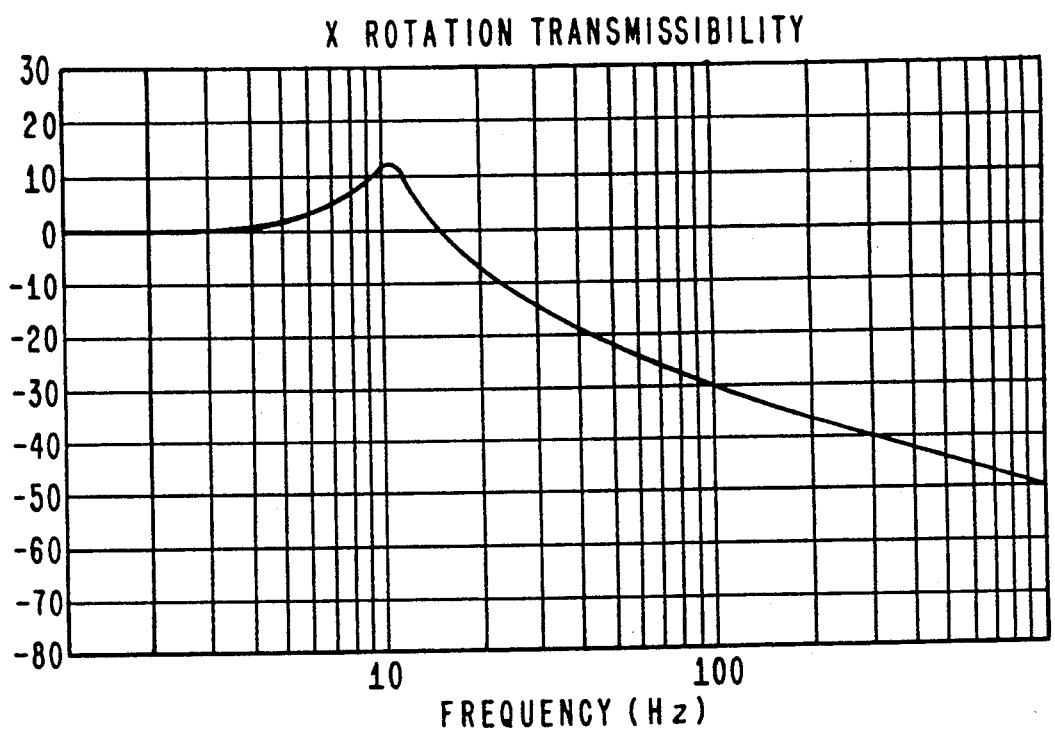
FIG. 13 is a graph showing transmission loss as a function of frequency for rotation about the X-axis of the preferred embodiment of the invention.
Figure 14:
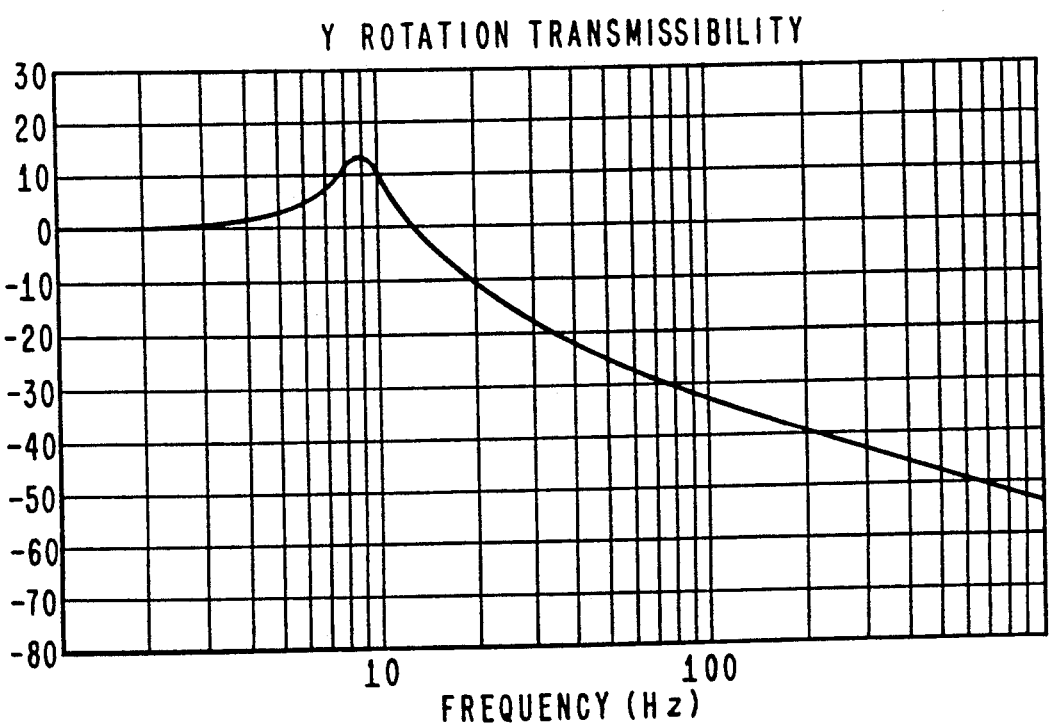
FIG. 14 is a graph showing transmission loss as a function of frequency for rotation about the Y-axis.

FIG. 11 shows that the translation transmissibility along the X axis reaches a peak at 4 Hz and attenuates rapidly thereafter. Y axis translation follows a similar characteristic as shown in FIG. 12. FIGS. 13 and 14 show the corresponding rotation transmissibility characteristics along the X rotation axis and the Y rotation axis, reaching a peak at approximately 9 to 10 Hz. A resonant frequency of 9 to 10 Hz is required for X and Y axis rotation in order to provide rigidity for the magnetic suspension control torques to be effectively applied. Thus, substantial isolation is obtained over a large frequency range in the X and Y coordinates, while allowing transmission of the desired control torque frequencies about the X, Y, and Z axes.

Stop stiffness is set to provide a compromise between the peak deflections under the launch conditions and the peak impact loads. The isolator element design also permits the use of a nonlinear damping technique to provide a higher damping constant during launch than in operation. Higher damping would reduce the impact loads without the necessity of increasing the stroke.

The novel use of tuning springs provides a low cost, convenient technique to tune the stiffness of the isolator element to provide a very tightly controlled frequency response. The tuning springs are positioned in a way that does not increase the interface dimensions. The upper and lower bellows are designed to provide approximately one third of the needed element stiffness, the tuning springs and the redundant seal bellows providing the remainder. A metal bellows is preferred over synthetic rubber or other polymers because of the better dimensional and stiffness controls offered. The damping coefficient can be changed significantly by using a different viscosity damping fluid. Thus, the design offers significant flexibility in optimizing performance.

While the present invention has been adapted to provide a complex mechanical impedance as a function of frequency which allows transmission of control torque producing frequencies while suppressing undesired vibration frequencies, it is clear that the isolator structure is also applicable for providing vibration isolation and damping in the absence of such control torques. Moreover, while the isolator elements have been skewed at a predetermined angle with respect to the Z axis, with the base of the isolator pairs and the upper joints of the isolators at a common radius R from the Z axis, other attitudes of the isolators may be desirable where the base and upper joints are constructed at differing radii to favor a desired transnational or rotational axis transmissibility characteristic.

While the invention has been described in its preferred embodiments, it is to be understood that the words which have been used are words of description rather than words of limitation and that changes may be made within the preview of the appended claims without departing from the true scope and spirit of the invention in its broader aspects.

We claim:

1. Vibration isolating and damping apparatus for passively isolating vibrations between a supporting structure and a supported structure having a center of mass while permitting movement of the supported structure over six degrees of freedom with respect to the supporting structure, wherein the supported structure contains a torque-producing device for developing predetermined control torques over a given vibration frequency range, comprising:

a cradle for supporting said supported structure, a plurality of vibration isolators, each isolator having a body, a first end flexibly secured to said supporting structure, and a second end flexibly secured to said cradle, said isolators supporting said cradle with respect to said supporting structure, pairs of said isolators having a common base on said supporting structure and having intersecting longitudinal axes disposed to define a substantially isosceles triangle at a predetermined acute angle with respect to said base, said pairs being substantially parallel to an azimuthal axis passing through said supporting structure and said cradle, said isolators being arranged in substantially equiangularly disposed pairs about said azimuthal axis, a flexible joint at each of said first and second ends of said isolators adapted to provide at least two degrees of freedom of motion, so that opposite ends of each said isolator are relatively movable axially, each of said isolators being movable relative to each other along their respect longitudinal axes while maintaining said supported structure in kinematic relation with said supporting structure, said isolators providing a predetermined complex impedance as as a function of vibration frequency and adapted for transmission of said control torques over said given vibration frequency range.

2. Vibration and damping isolation apparatus as set forth in claim 1 wherein said isolators are arranged in three pairs substantially 120 degrees apart, each isolator of each isolator pair being inclined substantially at 38.3 degrees relative to the plane of said supporting structure.

3. Vibration and damping apparatus as set forth in claim 2, said cradle further comprising a plurality of mounting surfaces for said supported structure distributed laterally and equiangularly thereupon and further comprising a member associated with each said pair of isolators extending at right angles to said cradle for supporting said second ends of said isolators so that the plane of said flexible joints thereat contains said center of mass of said supported structure.

4. Vibration and damping apparatus as set forth in claim 3, wherein said isolator comprises a viscous isolator.

5. Viscous vibration and damping apparatus as set forth in claim 4, wherein said isolator is comprised of a stem extending from said body to said second end supporting member, at least one said stem in each isolator pair having a portion laterally offset, for providing a clearance between stems of associated isolators.

6. Viscous vibration and damping apparatus as set forth in claim 5 wherein said isolators are so constructed and adapted to limit movement of said cradle relative to said supporting structure, further comprising means to limit movement of said cradle relative to said supporting structure to a predetermined maximum displacement, which movement is less than said maximum displacement of said cradle relative to said supporting structure provided for by said isolators.

7. Viscous vibration and damping apparatus as set forth in claim 6, wherein said means limiting the movement of said cradle to a predetermined maximum is comprised of first and second coaxial metallic tubes, said tubes disposed in parallel to the plane of said cradle and radial to said azimuthal axis passing through said cradle, being joined at a first end proximate to said azimuthal axis, said first tube being affixed to said cradle proximate to said isolator pairs, said cradle being provided with an aperture having a predetermined clearance for a stop arm extending radially and outwardly, said stop arm affixed to a second end of said second tube and disposed for constraining motion of said cradle relative to said supporting structure, whereat a predetermined deflection of said cradle induced by motion of said supported structure will cause said stop arm resiliently to apply a predetermined counterforce to said cradle, thereby restraining said isolator from deflection greater than a predetermined value.

8. Vibration and damping apparatus as set forth in claim 4, wherein said viscous isolator comprises:
- a base member having outer and inner faces and means for attaching said outer face of said base member to a supporting structure,
- a first bellows having a first end joined to said inner face of said base member for forming a fluid seal and having a second end joined to a first face of an axially aligned piston, said bellows being expansible and contractible in an axial direction thereof, said base member, said first bellows, and said piston defining a first fluid chamber filled with fluid,
- a first main cylindrical housing having a closed first end and an open second end, axially aligned with said piston and circumferentially joined with said second face of said piston at said open end,
- a second bellows axially aligned with said first bellows, received within said first main cylindrical housing and having a first end joined to said second face of said piston and a second end joined to a second hollow cylindrical housing coaxially disposed within said first main cylindrical housing, said second bellows being expansible and contractible in an axial direction of said first main cylindrical housing, said second bellows having an outer diameter less than an inner diameter of said first main cylindrical housing and in inner diameter greater than said second hollow cylindrical housing, an exterior of said second hollow cylindrical housing and said second bellows and said piston defining a second fluid chamber filled with fluid communicating with said first fluid chamber through an axial bore in said piston,
- said second hollow cylindrical housing having first and second closed ends and an annular bore and having an exterior centrally located flange forming a fluid seal with said second bellows,
- an axial shaft slideably disposed within an axial bore of said piston, said axial shaft distally joined to said interior face of said base member and proximally joined to said first end of said second cylindrical housing, said axial bore forming a radial gap with said axial shaft, said radial gap providing fluid coupling between said first and second fluid chambers,
- tuning spring means disposed between said interior face of said base and said first face of said piston and circumferentially disposed about said first bellows for providing a predetermined axial stiffness, and
- stem means connected to said first main cylindrical housing at said closed first end, adapted to move said piston axially when a force is applied to said stem means and to damp reciprocation of said stem means by utilizing viscous resistance of the fluid when said stem means moves in the axial direction of said first main cylindrical housing.

9. Vibration and damping apparatus as set forth in claim 8, wherein said viscous isolator further comprises:
- thermal compensator means, said thermal compensator means comprising:
- a thermal compensator bellows disposed within said second cylindrical housing and having a first end forming a fluid seal with an end cap defined by said second closed end of said second cylindrical housing, said thermal compensator bellows and said second cylindrical housing defining a third fluid chamber filled with fluid and fluidly coupled through a fluid passage in said axial shaft to said radial gap and to said first and second fluid chambers, and
- a compensator spring disposed without said annular bore of said second cylindrical housing and disposed within and coupled to said thermal compensator bellows for establishing positive pressure on said fluid with variations in temperature while allowing expansion or contraction of fluid volume by cooperating with corresponding contraction or expansion of said thermal compensation bellows.

10. A viscous isolator as set forth in claim 9, further comprising a third extensible and contractible bellows enclosing said first bellows and having an outer diameter disposed within said circumferentially disposed timing springs and providing a fluid seal between said inner face of said base and said first face of said piston, said piston having a further passage allowing pressure communication between said third bellows and said enclosure defined by said first main cylindrical housing and said second cylindrical housing.

11. Vibration isolating and damping apparatus for passively isolating vibrations between a supporting structure and a supported structure having a center of mass while permitting movement of the supported structure over six degrees of freedom with respect to the supporting structure, wherein the supported structure contains a torque-producing device for developing predetermined control torques over a given vibration frequency range, comprising:
- a cradle for supporting said supported structure,
- a plurality of isolators, each isolator having a body, a first end flexibly secured to said supporting structure, and a second end flexibly secured to said cradle, said isolators supporting said cradle with respect to said supporting structure, pairs of said isolators having a common base on said supporting structure and having intersecting longitudinal axes disposed to define a substantially isosceles triangle at a predetermined acute angle with respect to said base, said pairs being substantially parallel to an azimuthal axis passing through said supporting structure and said cradle, said isolators being arranged in substantially equiangularly disposed pairs about said azimuthal axis, a flexible joint at each of said first and second ends of said isolators adapted to provide at least two degrees of freedom of motion, so that opposite ends of each said isolator are relatively movable axially, each of said isolators being movable relative to each other along their respect longitudinal axes while maintaining said supported structure in kinematic relation with said supporting structure,
- said isolators providing a predetermined complex mechanical impedance as a function of vibration frequency and adapted for transmission of control torques over said given vibration frequency range, wherein said isolators are arranged in three pairs substantially 120 degrees apart, each isolator member of each isolator pair being inclined substantially at 38.3 degrees relative to the plane of said cradle, said cradle further comprising a plurality of mounting surfaces for said supported structure distributed laterally and equiangularly thereupon and further comprising a member associated with each said pair of isolators extending at right angles to said cradle for supporting said second ends of said isolators so that the plane of said flexible joints thereat contains said center of mass of said supported structure, wherein said isolator is comprised of a stem extending from said body to said second end supporting member, at least one said stem in each isolator pair having a portion laterally offset, for providing a clearance between stems of associated isolators, further comprising means to limit the movement of said cradle relative to said supporting structure to a predetermined maximum, which movement is less than a maximum deflection of said cradle relative to said supporting structure provided for by said isolators, wherein said means limiting the maximum movement of said cradle is comprised of first and second coaxial metallic tubes, said tubes disposed in parallel to the plane of said cradle and radial to said azimuthal axis passing through said cradle, being joined at a first end proximate to said azimuthal axis, said first tube being affixed to said cradle proximate to said isolator pairs, said cradle being provided with an aperture having a predetermined clearance for a stop arm extending radially and outwardly, said stop arm affixed to a second end of said second tube and disposed for constraining said motion of said cradle relative to said supporting structure, whereat a predetermined deflection of said cradle induced by motion of said supported structure will cause said stop arm resiliently to apply a predetermined counterforce to said cradle, thereby restraining said isolator from deflection greater than a predetermined value.

12. Vibration isolating and damping apparatus for passively isolating vibrations between a supporting structure and a supported structure while permitting movement of the supported structure over six degrees of freedom with respect to the supporting structure, comprising:

a cradle for supporting said supported structure, a plurality of vibration isolators, each isolator having a body, a first end flexibly secured to said supporting structure, and a second end flexibly secured to said cradle, said isolators supporting said cradle with respect to said supporting structure, pairs of said isolators having a common base on said supporting structure and having intersecting longitudinal axes disposed to define a substantially isosceles triangle at a predetermined acute angle with respect to said base, said first ends of said isolators being disposed at a first predetermined radius with respect to an azimuthal axis passing through said supporting structure and said cradle, said isolators being arranged in substantially equiangularly disposed pairs about said azimuthal axis, a flexible joint at each of said first and second ends of said isolators adapted to provide at least two degrees of freedom of motion, so that opposite ends of each said isolator are relatively movable axially, each of said isolators being movable relative to each other along their respect longitudinal axes while maintaining said supported structure in kinematic relation with said supporting structure, said second ends of said isolators being disposed at a further predetermined radius from said azimuthal axis, said isolators providing a predetermined complex impedance as a function of vibration frequency and adapted for transmission of said control torques over said given vibration frequency range.

* * * * *